United States Patent Office 3,738,988
Patented June 12, 1973

3,738,988
PROCESS FOR OXIDATION OF DIHYDRO-
QUINACRIDONES TO QUINACRIDONES
Julius Jackson, Westfield, N.J., assignor to E. I. du Pont
de Nemours and Company, Wilmington, Del.
No Drawing. Filed Oct. 8, 1970, Ser. No. 79,254
Int. Cl. C07d 39/00
U.S. Cl. 260—279 R                                6 Claims

ABSTRACT OF THE DISCLOSURE

Quinacridones are prepared by oxidation of a corresponding 6,13 dihydroquinacridone in aqueous slurry using less than the stoichiometric amount of an anthraquinone sulfonic acid as oxidizing agent. The oxidizing agent is regenerated in situ by bubbling an oxygen-containing gas through the slurry. Divalent iron, cobalt or nickel ions in the slurry increase the effectiveness of the oxidation. Selective oxidation is possible to either completely β-crystal phase product or to completely γ-crystal phase product as desired without formation of any quinacridonequinone.

BACKGROUND OF THE INVENTION

The quinacridones are well known as pigments. One method for their production involves oxidation of a 6,13 dihydroquinacridone, as first disclosed in U.S. Patent 2,821,529. The oxidation is described therein as occurring with certain mild oxidizing agents in an alkaline medium which includes both alcohol and water. While the preferred oxidizing agent is stated to be the sodium salt of nitrobenzene-m-sulfonic acid, air or oxygen is stated to function. More recently U.S. Patent 3,475,436 discloses such oxidation but in this case the reaction is effected in an alkaline medium that includes both water and tetramethylene sulfone. In U.S. Patent 3,024,239 the class of anthraquinone sulfonic acids are proposed as oxidizing agents for the manufacture of quinacridones from 6,13 dihydroquinacridones and the alkaline medium again includes both water and alcohol. The aforementioned processes, because they utilize an organic solvent, pose disadvantages for a commercial operation. This is particularly true from the standpoint of economics, since means must either be provided for recovering the more costly organic solvent or it must be discarded. Still a further disadvantage of such processes is that they tend to be complicated by the need for excessively long reaction times and highly dilute reaction media.

SUMMARY OF THE INVENTION

It has been discovered that the oxidation of a 6,13 dihydroquinacridone to the corresponding quinacridone may be effected in aqueous alkaline medium in the absence of an organic solvent employing as the oxidizing agent an anthraquinone sulfonic acid in an amount which is less than the stoichiometric amount theoretically required. The oxidizing agent is regenerated during the oxidation process by bubbling an oxygen-containing gas through the slurry. Suitably selected surfactants may be used to assist in wetting of the 6,13 dihydroquinacridone and anti-foam agents may be used to reduce foaming during the aeration step. The presence of divalent iron, cobalt or nickel ions in the slurry during the oxidation process is highly advantageous in that the effectiveness of the oxidation is thereby increased. As will be illustrated in the specific embodiments of the invention, it is also possible to direct the course of the oxidation, i.e. to obtain either β-crystal phase product or γ-crystal phase product by introduction to the reaction slurry of fine particle seeds of a quinacridone having the desired crystal phase.

In a preferred process according to the invention the oxidation is effected at reflux temperature, e.g. of 105 to 110° C., in aqueous alkaline slurry in the presence of ions of a divalent metal of the group consisting of iron, cobalt and nickel while introducing an oxygen-containing gas into the slurry, the molar ratio of the anthraquinone sulfonic acid salt to the dihydroquinacridone in the slurry being at least about 0.004:1 but less than 1:1 and the molar ratio of the divalent metal ions to the dihydroquinacridone being in the range of about 0.02:1 to about 0.5:1.

DETAILS OF THE INVENTION

This invention is applicable to unsubstituted 6,13-dihydroquinacridone, as is preferred, but is also applicable to substituted dihydroquinacridones which are significantly soluble in aqueous alkali, for example, 4,11-dimethyl-6,13-dihydroquinacridone and 2,9-difluoro-6,13-dihydroquinacridone.

All of these are encompassed within the following generic formula:

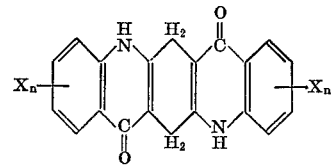

where X is halogen, lower alkyl or lower alkoxy (up to 3 carbon atoms) and $n$ is 0 to 2. It will be understood that the oxidation process proceeds more slowly with certain substituted dihydroquinacridones than with the unsubstituted material.

The use of both α and β anthraquinone sulfonic acid as well as the salt of 1–8 anthraquinone disulfonic acid will be illustrated in the examples below. Other anthraquinone sulfonic acids that may be employed are disclosed in aforementioned U.S. Patent 3,024,239. The acids may be charged as such to the reaction vessel since the corresponding alkaline salt will be formed in the alkaline medium. If an alkaline metal salt of an anthraquinone sulfonic acid is to be used, it may be of a metal such as sodium, potassium or lithium.

Only a small proportion of anthraquinone sulfonic acid is required since it will be continuously regenerated by the air or other oxygen-containing gas being bubbled through the slurry. Large proportions are not detrimental but are uneconomical. While the molar ratio thereof to dihydroquinacridone can be up to 1:1 or even more, desirably it is at least 0.004:1 and preferably 0.01 to 0.5.

The divalent metal ions are conveniently provided in the reaction slurry in the form of water soluble salts such as the sulfates of iron, cobalt or nickel. The molar ratio of such metal to dihydroquinacridone should be in the range of about 0.02:1 to about 0.5:1, preferably about 0.1:1 to 0.3:1.

The alkaline slurry for carrying out the oxidation is desirably free of organic solvents. The nature of the alkali can be varied but sodium hydroxide and potassium hydroxide are especially preferred. Generally at least 2 moles of alkaline metal hydroxide are required per mole of dihydroquinacridone. Upon completion of the oxidation reaction, the quinacridone product can be removed from the alkaline liquid by filtration, washing and drying in a conventional manner.

In the operation of the process of this invention, it appears that when a dihydroquinacridone in the α-phase is used as the material to be oxidized, and no additional phase-director is present, the usual linear quinacridone product which is obtained will be in the β-crystal phase. This is ensured, however, by inclusion of a portion of fine particle size seeds of the corresponding β-crystal phase quinacridone in the reaction slurry. When the dihydroquinacridone to be oxidized is in the β-crystal phase, the product will be in the γ-phase. If the dihydroquinacridone used is largely α-crystal phase, but a portion of the corresponding γ-crystal phase quinacridone is included in the reactant mix as fine particle size seed material, the linear QA product will be completely in the γ-phase. When β or γ-phase seed material of a quinacridone is used as a phase director, the molar ratio thereof to the dihydroquinacridone should be about 0.1 to 0.5, and preferably 0.1 to 0.3. The source of the seed material is not critical as it can be prepared either in accordance with the invention or other processes. It will be understood that the term "quinacridone" as used herein is intended to designate the linear quinacridone form.

The following examples will further illustrate the invention. In the examples parts and percentages are by weight unless otherwise indicated.

EXAMPLE 1

Slurry preparation

A sample of α-6,13-dihydroquinacridone (DQA) is prepared according to the process described in Example 1 of U.S. 2,821,529 by heating diethyl 2,5-dianilino-3,6-dihydroterephthalate in an eutectic mixture of biphenyl and diphenyl oxide. The heating is carried out in the absence of oxygen at 225–300° C. for a period of 1 to 5 hours.

Of the α-6,13-DQA thus prepared, 90 g. (0.285 mole) is slurried in 200 cc. water. Since α-DQA is not readily wetted by water, it is found beneficial to include surface active agents to assist in wetting the DQA. In addition, it is found useful to include an anti-foam agent in the reactant mixture since the poor wetting characteristic of the resultant QA tends to result in formation of a difficultly stirrable foam when, in a subsequent step of the operation, air is bubbled through the mix. The following surfactants are added: Two cc. ethylene glycol butyl ether, commercially available as "Dowanol EB" sold by Dow Chemical Co., one and one-half cc. ethoxylated acetylenic glycol, commercially available as "Surfynol 485," sold by Airco Chemical Company. As an anti-foam agent, one cc. of an alkyl aryl sulfonate, commercially available as "Emcol P10-59," sold by Witco Chemical Company, is added.

The mixture of DQA, $H_2O$, surface active agents, and anti-foam agent is stirred for five minutes at room temperature in a flask equipped with agitator, reflux condenser, and heating mantle. Two hundred fourteen cc. of 50% NaOH (4.04 moles) is then washed in with 15 cc. $H_2O$. The temperature of the mixture is adjusted to 105–110° C. and held constant for 30 minutes.

Preparation of β–QA in presence of $Fe^{++}$ (a) At this time, 1.33 g. β-sodium anthraquinone monosulfate (AQS) and 18.5 g. $FeSO_4.7H_2O$ in 30 cc. of $H_2O$ are added to the slurry and a flow of air is started to bubble through the mixture. The molar ratios of the reactants are as follows:

0.0150 mole AQS per mole of DQA
0.233 mole $FeSO_4.7H_2O$ per mole of DQA

The temperature is held at reflux (105–110° C.) for two and one-half hours while the air flow is continued, the walls of the flsk being washed down with 60 cc. $H_2O$ at the end of the first and second hours of boil.

The mixture is diluted by discharging into six liters of water containing 106 cc. of 98% $H_2SO_4$, the pH of the diluted slurry being 11.5. Concentrated hydrochloric acid is added to adjust the pH to 1.6, and the slurry heated to 95° C. and held at this temperature for 45 minutes. The slurry is filtered and the cake washed sulfate-free. The product weighs 93.5 g. Infrared analysis shonws no DQA present and X-ray analysis shows only β–QA.

(b) The procedure of (a), above, is repeated using 2.5 g. AQS and the ferrous sulfate is omitted. Nearly five hours is required until the product shows an absence of DQA.

(c) The procedure of (a) is repeated except that the 90 g. α–DQA starting material is initially slurried in 450 cc. $H_2O$ instead of 200 cc. This has no adverse effect on the operation of the process nor the quality of the product. The lower limit on the amount of water to be used is set only by the increasing viscosity of the slurry.

(d) The procedure of (a) is repeated except that the amount of NaOH used is reduced by 25%. The oxidation of the DQA proceeds satisfactorily, although somewhat slower than before.

(e) The procedure of (a) is repeated except the amount of AQS is reduced from 1.33 g. to 0.83 g. The reaction occurs without adverse effect. However, when repeated with only 0.33 g. AQS, the DQA is not completely oxidized.

(f) The procedure of (a) is repeated except that the amount of $FeSO_4.7H_2O$ is reduced from 18.5 g. to 9.26 g. (0.117 mole $FeSO_4.7H_2O$/mole DQA). Again, the change gives no adverse effect.

EXAMPLE 2

Preparation of β–QA in presence of $Fe^{++}$ and β–QA seed

This example illustrates the improved efficiency using $FeSO_4.7H_2O$ in substitution for a portion of the anthraquinone sulfonic acid as the active agent for effecting the oxidation reaction, as in Example 1, but further illustrates use of preformed β–QA as seed material to direct the crystal phase of the QA product of the oxidation, and to reduce the requirement for the anthraquinone sulfonic acid.

For this example, there is used, as seed, four and one-half g. of a small-particle-size, dispersion-milled β–QA. This small particle size β-phase QA is prepared by oxidation of DQA with nitrobenzene-m-sodium sulfonate in a water-sodium hydroxide-methanol mixture having the ratio of about 100:30:130, and isolating the dry pigment product. This product is ground in a ball mill at 70° C. for six hours using aluminum sulfate and tetrachloroethylene, with a surfactant comprising an amine dodecyl benzene sulfonate, the procedure being described in detail in Example V of U.S. Patent 3,030,370. The product was an intense violet-colored pigment of excellent strength with an X-ray pattern showing β-phase QA.

Subsequently 90 g. of DQA plus the 4.5 g. of seed QA are treated under the same conditions as given for "Slurry Preparation" in Example 1. After the 30 minute hold period at 105–110° C., 0.5 g. β-sodium anthraquinone monosulfonate and 13.9 g. $FeSO_4.7H_2O$ in 30 cc. $H_2O$ are added. (These molar ratios are: 0.0057 mole AQS per mole DQA; and 0.175 mole $FeSO_4.7H_2O$ per mole DQA.) Air is bubbled through the mixture while the temperature is held at 105–110° C. The walls of the flask are washed down at hourly intervals using a 50 cc. portion of water each time. A sample of the reaction mix is taken at the conclusion of 3¼ hours of refluxing and is found by infrared analysis to be completely QA, with no unoxidized DQA present. By X-ray analysis, the crystal form of the product is found to be completely β-phase. The β–QA can be collected by the method of Example 1(a).

EXAMPLE 3

Preparation of γ–QA from β–DQA

A 90 g. portion of α–DQA is converted to β–DQA. To effect this conversion, the α–DQA is slurried in 105 cc. $H_2O$, 400 cc. of methanol, and 56.2 g. of 50% NaOH. The mixture is stirred for 20 minutes and surfactants and anti-foaming agent are added as described in Example 1:

2 cc. "Dowanol EB"
1.5 cc. "Surfynol #485"
1.0 cc. "Emcol P10-59"

The mixture is heated to reflux and held at the reflux temperature for 10 minutes. The methanol is then removed by fractional distillation until the temperature reaches 98° C. The α–DQA has now been converted to the β-crystal phase.

At this point the following are added to the flask:

110 cc. water
159 cc. 50% NaOH
1.5 g. β-sodium anthraquinone monosulfonate (ratio: 0.0170 mole/mole DQA)
13.9 g. $FeSO_4.7H_2O$ in 30 cc. $H_2O$ (ratio 0.175 mole/mole DQA)

Air flow is begun through the mixture which is now heated to reflux (105–110° C.). After five hours, the flask walls are washed down with 50 cc. $H_2O$, and refluxing and air flow are continued for a total of eight hours.

The mixture is diluted by discharging into six liters of water containing 106 cc. of 98% $H_2SO_4$, the pH of the diluted slurry being 11.5. Concentrated hydrochloric acid is added to adjust the pH to 1.6, the slurry heated to 95° C. and held at this temperature for 45 minutes. The slurry is filtered and the cake washed sulfate-free.

By infrared analysis, the product is found to contain no DQA and by X-ray analysis is shown to be completely γ–QA.

EXAMPLE 4

Preparation of γ–QA from α–DQA via γ–QA seeding

This example illustrates the preparation of γ-phase QA using α–DQA and a portion of γ–QA seed to direct crystal formation.

A slurry is prepared of the following:

9.0 g. γ–QA prepared in fine particle size according to the procedure described in U.S. 3,030,370, Example III
90 g. DQA
200 cc. $H_2O$
2 cc. "Dowanol EB"
1.5 cc. "Surfynol 485"
1.0 cc. "Emcol P10–59"

The mixture is stirred for five minutes in equipment fitted with reflux condensers, agitator, and heating mantle. There is then added with good agitation, 214 cc. of 50% NaOH which is washed in with 15 cc. $H_2O$. The system is heated to reflux (105–110° C.) and heating continued for 30 minutes after which 0.5 g. β-sodium anthraquinone monosulfonate and 13.9 g. $FeSO_4.7H_2O$ in 30 cc. $H_2O$ are added. The ratios of reactants are 0.0057 mole AQS per mole DQA, and 0.175 mole $FeSO_4.7H_2O$ per mole DQA. Aeration of the mixture is begun and continued, while maintaining reflux, for a period of five hours. The walls of the flask are washed down hourly with 50 cc. portions of $H_2O$. At the conclusion of the heating period, the pigment is acid-extracted according to the procedure given in Example 1(a), the product washed and dried. Infrared analysis shows no DQA present and X-ray analysis shows the product to be completely γ-phase QA.

The process of this example is repeated using only 50% of the amount of γ–QA as seed, i.e., 4.5 g. γ–QA. There is no adverse effect on process operation nor quality of product obtained.

The process was again repeated increasing the amount of β-sodium anthraquinone sulfonate to three times the amount used; i.e., to 1.5 g. No advantage in process or product is observed by use of the increased amount of this reactant.

EXAMPLE 5

Preparation of γ–QA in the presence of $Co^{++}$

The procedure of Example 4 is followed except that 14 g. $CoSO_4.7H_2O$ is used instead of 13.9 g. $FeSO_4.7H_2O$. The product is examined by infrared analysis and shows no DQA to be present. By X-ray analysis, the product is found to be completely γ-phase QA.

EXAMPLE 6

Preparation of γ–QA in the presence of $Ni^{++}$

The procedure of Example 4 is repeated with the following changes in reactants and amounts of ingredients:

4.5 g. γ–QA prepared in fine particle size is used in place of 9.0 g.
300 cc. of water is used to prepare the slurry instead of 200 cc.
13.05 g. $NiSO_4.6H_2O$ is used in place of 13.9 g. $FeSO_4.7H_2O$ Infrared analysis of the product shows no DQA present, and X-ray analysis shows the product to be completely γ-phase QA.

EXAMPLE 7

Preparation of β–QA using LiOH

The procedure given in Example 1 for "Slurry Preparation" is repeated with the exception that for the 214 cc. of NaOH, there is used 112.5 g. $LiOH.H_2O$ slurried in 307 cc. of water. This LiOH is washed in with 15 cc. of water. At the conclusion of the 30 minutes heating period, 2.5 g. of β-sodium anthraquinone monosulfonate and 13.9 g. $FeSO_4.7H_2O$ are added to the mixture. A flow of air is bubbled through the mixture, and refluxing is continued (temperature 105–110° C.) for a period of 12 hours. The walls of the flask are washed down with 50 cc. of water after the first, third and fourth hours of refluxing. The slurry is finished off by diluting to a total of 6 liters, again heating to the boil, and filtering. The filter cake is washed alkaline free, and dried. The product is found to be β–QA. The only disadvantage found in the substitution of LiOH for NaOH according to the process of this example, is that the oxidation of the DQA proceeds more slowly than when NaOH is used.

EXAMPLE 8

Preparation of β–QA using α–AQS

This example illustrates the use of α-sodium anthraquinone monosulfonate instead of the β-sodium anthraquinone monosulfonate used in the previous examples.

The procedure of Example 1 for "Slurry Preparation" is followed with the exception that the 90 g. of DQA used is slurried in 300 cc. of water rather than 200 cc.

At the conclusion of the 30 minutes heating time, there is added to the slurry 2.5 g. α-sodium anthraquinone monosulfonate and 13.9 g. $FeSO_4 \cdot H_2O$. Refluxing is continued at a temperature of 105–110° C. for a total of 5⅓ hours. The walls of the flask are washed down with 50 cc. of water after the first, third and fourth hours of refluxing.

The product is recovered from the slurry as in Example 1(a) and found to be almost completely β–QA. The period required for oxidation of DQA is essentially the same regardless of whether the α-sodium salt or the β-sodium salt is used.

EXAMPLE 9

Preparation of γ–QA using 1–8 anthraquinone disulfonic acid

This example illustrates the use of anthraquinone disulfonic acid as a reactant material in place of the sodium salt of the monosulfonic acid as illustrated in the above examples. The disulfonic acid used in this example is, of course, converted to its alkali metal salt during the course of the refluxing in the strongly alkaline medium.

For operation of this example, 90 g. of DQA is formed into a slurry according to the "Slurry Preparation" procedure of Example 1 except that 300 cc. of water is used.

At the conclusion of the 30 minute heating period, 8.5 g. of 1–8 anthraquinone disulfonic acid at 35% concentration of the acid is added to the mixture along with 13.9 g. $FeSO_4 \cdot H_2O$. The refluxing is continued at a temperature of 105–110° C. for 5⅓ hours, the walls of the flask being washed down with 50 cc. of water after the first, third, and fourth hours of heating.

The pigment product was recovered according to the procedure of Example 1(a) and found to be, by X-ray analysis, γ-phase QA.

Since it is obvious that many changes and modifications can be made in the above-described details without departing from the nature and spirit of the invention, it is to be understood that the invention is not to be limited to said details except as set forth in the appended claims.

What is claimed is:

1. In a process for producing a quinacridone by oxidation of an alkali soluble 6,13 dihydroquinacridone with an alkaline metal salt of an anthraquinone sulfonic acid as oxidizing agent, the improved method which comprises effecting said oxidation at refluxing temperature in aqueous alkaline slurry free of organic solvents and in the presence of ions of a divalent metal of the group consisting of iron, cobalt and nickel by introducing a molecular-oxygen-containing gas into the slurry, the molar ratio of said anthraquinone sulfonic acid salt to said dihydroquinacridone in said slurry being at least about 0.004:1 but less than 1:1 and the molar ratio of said divalent metal ions to said dihydroquinacridone being in the range of about 0.02:1 to about 0.5:1.

2. Process according to claim 1 in which the slurry further contains a surfactant.

3. Process according to claim 1 in which said divalent metal is iron.

4. Process according to claim 3 in which said anthraquinone sulfonic acid salt is β-sodium anthraquinone monosulfonate.

5. Process according to claim 1 in which said dihydroquinacridone is α-6,13 dihydroquinacridone and there are included in said slurry about 0.1 to 0.5 mole, per mole of dihydroquinacridone, of preformed seeds of fine particle size of γ quinacridone to thereby direct the production to γ-crystal phase product.

6. Process according to claim 1 in which the dihydroquinacridone is α-6,13 dihydroquinacridone and there are included in said slurry about 0.1 to 0.5 mole per mole of dihydroquinacridone, of preformed seeds of fine particle size of a β quinacridone to thereby direct the production to β-crystal phase product.

References Cited

UNITED STATES PATENTS

| 3,024,239 | 3/1962 | Caliezi | 260—279 |
| 3,121,718 | 2/1964 | Higgins | 260—270 |
| 3,475,436 | 10/1969 | Cooper | 260—279 |

FOREIGN PATENTS

| 1,328,160 | 7/1961 | France | 260—279 |

DONALD G. DAUS, Primary Examiner

U.S. Cl. X.R.

260—370, 687